US008682950B2

(12) United States Patent
Yang et al.

(10) Patent No.: US 8,682,950 B2
(45) Date of Patent: Mar. 25, 2014

(54) COMPUTER-IMPLEMENTED SYMBOLIC POLYNOMIAL FACTORIZATION

(75) Inventors: Xu Yang, Beijing (CN); Xiaolin Quan, Beijing (CN); Zhihui Ba, Beijing (CN); Dongmei Zhang, Bellevue, WA (US)

(73) Assignee: Microsoft Corporation, Redmond, WA (US)

( * ) Notice: Subject to any disclaimer, the term of this patent is extended or adjusted under 35 U.S.C. 154(b) by 880 days.

(21) Appl. No.: 12/790,617

(22) Filed: May 28, 2010

(65) Prior Publication Data

US 2011/0295920 A1    Dec. 1, 2011

(51) Int. Cl.
 *G06F 7/38*    (2006.01)

(52) U.S. Cl.
USPC ............................ 708/446; 708/200; 708/270

(58) Field of Classification Search
None
See application file for complete search history.

(56) References Cited

U.S. PATENT DOCUMENTS

| 6,792,569 | B2 | 9/2004 | Cox et al. | |
| 2005/0149832 | A1* | 7/2005 | Liberol et al. | 714/781 |
| 2009/0287756 | A1 | 11/2009 | Lauter et al. | |
| 2009/0298039 | A1* | 12/2009 | Glazier | 434/362 |

OTHER PUBLICATIONS

Backes, "Factorization of Univariate Polynomials" disseration Universitat des Saarlandes, Apr. 25, 2002, p. 1-p. 105.
Bernardin, "Factorization of Multivariate Polynomials over Finite Fields", Dissertation submitted to the ETH Zurich for the degree of Doctor of Techinal Sciences, 1999, p. 1-p. 117.
Hecker, "Enhanced symbolic factorization for low order LFT-modelling and improved analysis for RCAM", AIAA Guidance, Navigation and Control Conference and Exhibit, Aug. 20-23, 2007, Hilton Head, South Carolina, 2007 AIAA, pp. 1-pp. 17.
Kayal, "Solvability of a System of Bivariate Polynomial Equations over a Finite Field (extended abstract)" retrived at <<http://dimacs.rutgers.edu/~kayaln/ps/bivariate_solvability.ps>> on Apr. 16, 2010.
Mathlink, "Symbolic-numerical polynomial solving", retrived at <<http://www.mathematik.uni-kl.de/~zca/Reports_on_ca/30/paper_html/node5.html>> on Apr. 16, 2010, p. 1-p. 3.
Mittal et al., "Symbolic Computation of the Roots of any Polynomial with Integer Coefficients", retrived at <<http://arxiv.org/ftp/math/papers/0001/0001144.pdf>> on Apr. 16, 2010, pp. 1-10.

* cited by examiner

*Primary Examiner* — Michael D Yaary
(74) *Attorney, Agent, or Firm* — Carole Boelitz; Micky Minhas; Lee & Hayes PLLC (57) ABSTRACT

An input polynomial, in symbolic form, is received, classified, pre-processed, and factored. The input polynomial is classified as a constant, a univariate polynomial, or a multivariate polynomial. Various pre-processing is performed depending on the classification. After the input polynomial is pre-processed, the remaining polynomial is factored using a polynomial factoring algorithm. By pre-processing the input polynomial, the complexity of the polynomial to be factored is reduced, which reduces the computational expense of the polynomial factoring algorithm.

17 Claims, 7 Drawing Sheets

COMPUTER-IMPLEMENTED SYMBOLIC POLYNOMIAL FACTORIZATION

BACKGROUND

Computer algebra systems are computer-implemented applications that manipulate mathematical expressions in symbolic form. Computer algebra has many applications in fields such as physics, engineering, and education.

One specific function performed by many computer algebra systems is polynomial factorization. The Berlekamp-Zassenhaus algorithm is an algorithm for factoring polynomials with rational coefficients. The complexity of the Berlekamp-Zassenhaus algorithm depends exponentially on the number of modular factors of the polynomial.

Computer algebra systems, in general, are challenged by polynomials that represent an infinite series. Furthermore, many computer algebra algorithms function best when applied to monic polynomials (i.e., polynomials with a leading coefficient of 1). Depending on the form of an input polynomial, and the processing to be performed, it is sometimes useful to calculate the inverse of the input polynomial and/or to convert a non-monic input polynomial to a monic polynomial.

SUMMARY

This document describes techniques for computer-implemented symbolic polynomial factorization. An input polynomial is pre-processed prior to being factored. The pre-processing reduces the complexity of the input polynomial, and thereby reduces the computational expense associated with a polynomial factoring algorithm.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter. The term "techniques," for instance, may refer to device(s), system(s), method(s) and/or computer-readable instructions as permitted by the context above and throughout the document.

BRIEF DESCRIPTION OF THE DRAWINGS

The detailed description is described with reference to the accompanying figures. In the figures, the left-most digit(s) of a reference number identifies the figure in which the reference number first appears. The same numbers are used throughout the drawings to reference like features and components.

DETAILED DESCRIPTION

As described herein, a computer algebra application classifies an input polynomial, pre-processes the polynomial, and factors the input polynomial according to the classification.

The discussion begins with a section entitled "Example Symbolic Polynomial Factorization," which describes one non-limiting series of processes that may be implemented to calculate the factors of an input polynomial. A section entitled "Example Computing Device" follows, and illustrates and describes an example computing device that may implement the described symbolic polynomial factorization. A third section, entitled "General Operation," illustrates and describes example processes for performing symbolic polynomial factorization. Finally, a fourth section, entitled "Berlekamp-Zassenhause (d-1) Test," illustrates and describes a test that, when added to the Berlekamp-Zassenhaus algorithm, improves the algorithm's performance.

This brief introduction, including section titles and corresponding summaries, is provided for the reader's convenience and is not intended to limit the scope of the claims, nor the proceeding sections.

Example Symbolic Polynomial Factorization

Figure 1:
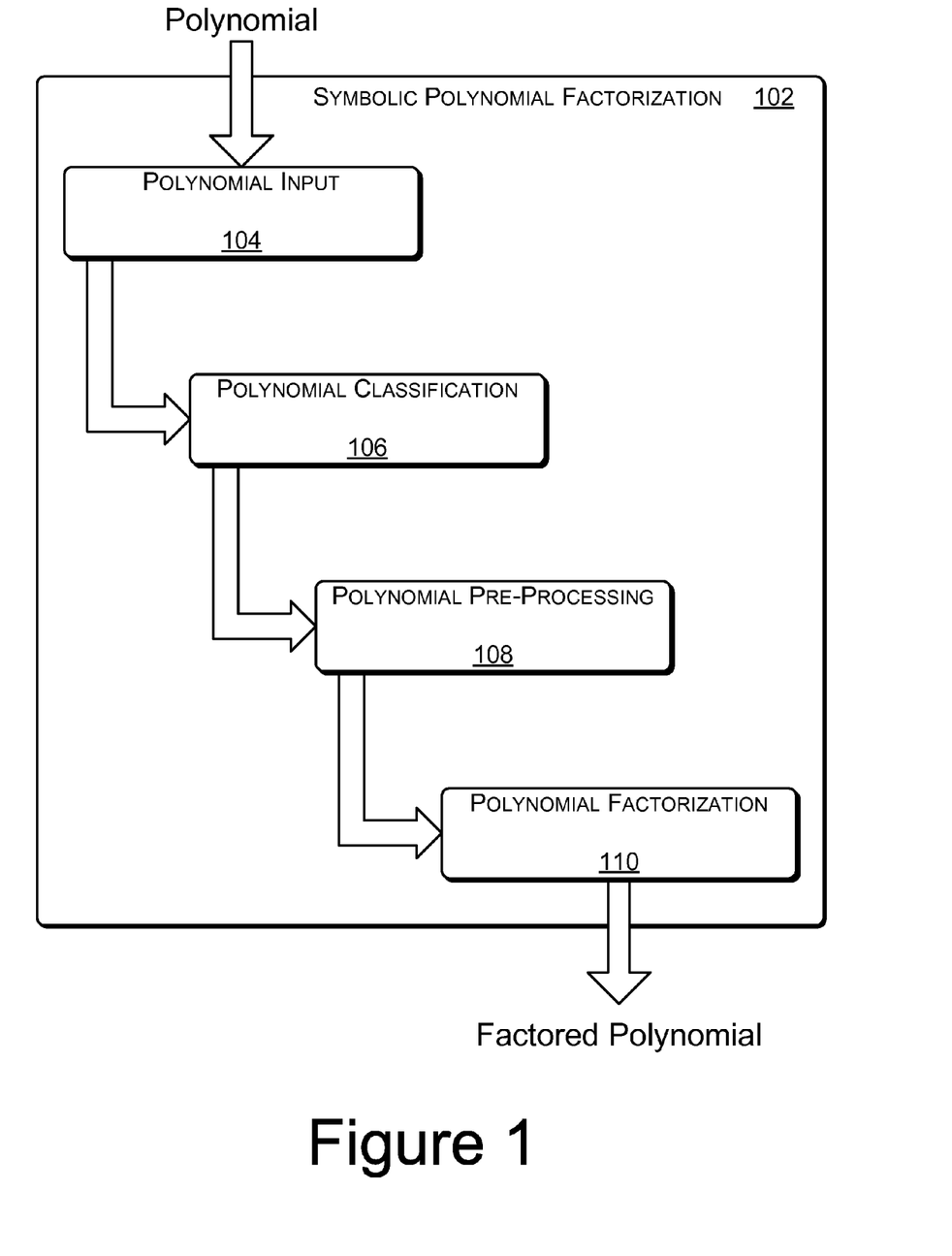
FIG. 1 is a block diagram that illustrates an example symbolic polynomial factorization process.

FIG. 1 illustrates an example process of symbolic polynomial factorization 102. The example process 102 includes polynomial input 104, polynomial classification 106, polynomial pre-processing 108, and polynomial factorization 110.

According to block 104, a polynomial is input. An input polynomial may have any of a variety of characteristics (e.g., values of coefficients, number of terms, number of variables, powers of variables, etc.). An input polynomial may include, but is not limited to, any of the following example formats:

$f(x)=a$ $f(x)=ax^m$ $f(x)=ax^m+b$ $f(x)=\Sigma_{i=0}^{n} a_i x^{b_i}$ $f(x, y)=ax^m y^n$ $f(x, y)=\Sigma_{i=0}^{n} a_i x^{b_i} y^{c_i}$ Polynomial classification 106 represents a process for determining the characteristics of an input polynomial. Example classifications of an input polynomial include, but are not limited to, a constant, a univariate polynomial, or a multivariate polynomial.

Polynomial pre-processing 108 represents pre-processing that may be applied to an input polynomial to simplify the input polynomial prior to factoring the polynomial. Pre-processing may include, but is not limited to factoring a single term polynomial, factoring out a greatest common factor of the coefficients of the input polynomial, factoring out the lowest power of each variable found in each term of the input polynomial, factoring roots of an input polynomial, performing variable replacement, factoring a multivariate polynomial according to each single variable, calculating an approximate inverse of the input polynomial, and applying a linear transformation to the variables of the input polynomial.

Polynomial factorization 110 represents a process for factoring a polynomial based on a classification of the polynomial. For example, a different process may be used to factor a multivariate polynomial than would be used to factor a univariate polynomial.

Polynomial classification 106, polynomial pre-processing 108, and polynomial factorization 110 are discussed in further detail below with reference to FIGS. 3-7.

Example Computing Device

Figure 2:
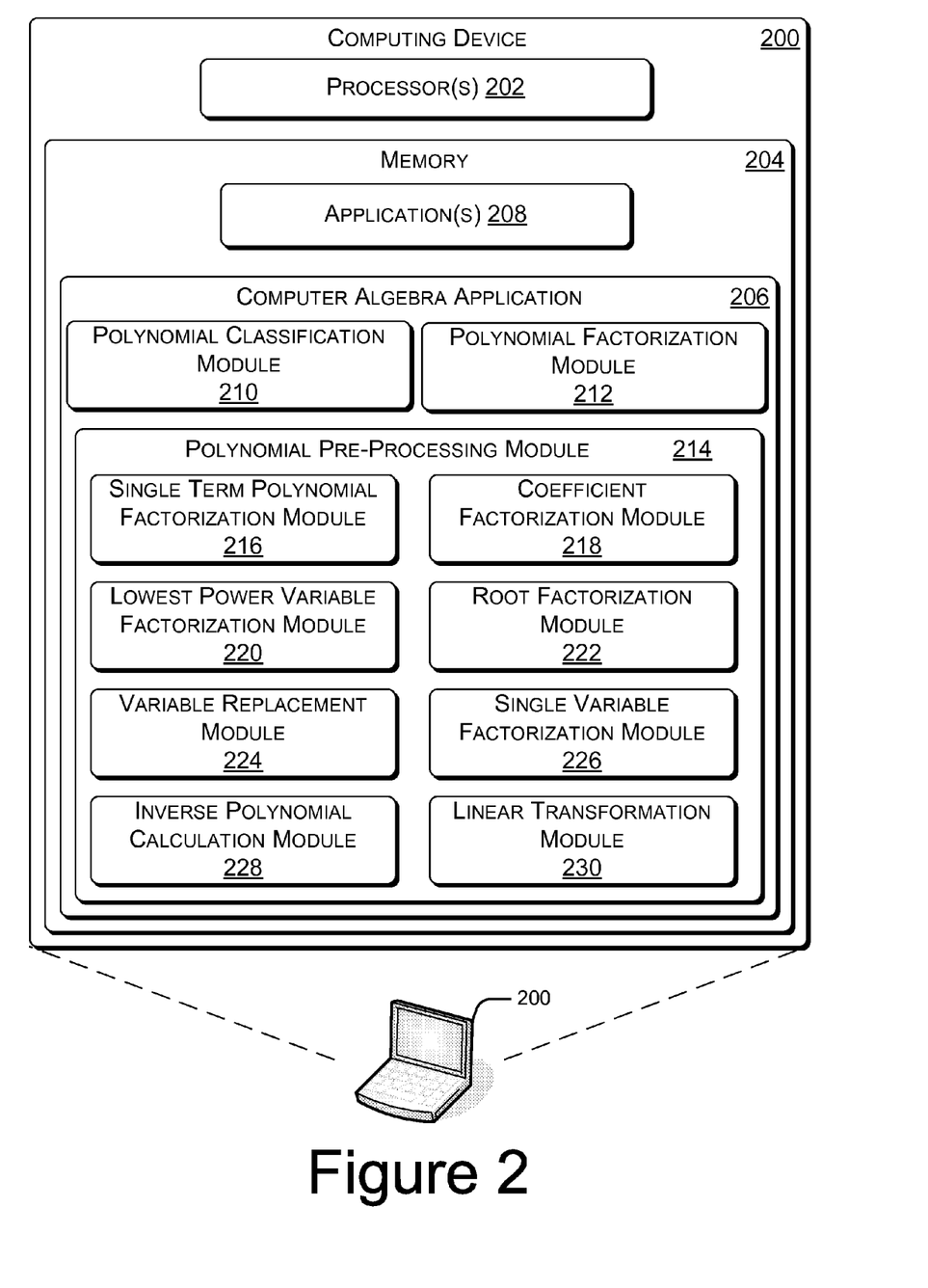
FIG. 2 is a block diagram that illustrates components of an example computing device that implements the symbolic polynomial factorization process of FIG. 1.

FIG. 2 illustrates an example computing device 200 that may implement the techniques for performing symbolic factorization of an input polynomial. Computer device 200 includes one or more processors 202 and memory 204 to store and execute a computer algebra application 206 and any number of other applications 208.

Example computer algebra application 206 includes, but is not limited to, polynomial classification module 210, polynomial factorization module 212, and polynomial pre-processing module 214. Polynomial classification module 210 analyzes an input polynomial to determine, for example, whether the input polynomial is a univariate polynomial (i.e., a polynomial having only a single variable) or a multivariate polynomial (i.e., a polynomial having multiple variables).

Example polynomial pre-processing module 214 includes single term polynomial factorization module 216, coefficient factorization module 218, lowest power variable factorization module 220, root factorization module 222, variable replacement module 224, single variable factorization module 226, inverse polynomial calculation module 228, and linear transformation module 230. Polynomial pre-processing module 214 may also include other modules, not shown, that further pre-process an input polynomial to simply factorization of the polynomial.

Single term polynomial factorization module 216 is configured to perform a straightforward factorization of a single term polynomial. For example, a univariate, single term input polynomial having the form $ax^m$ is factored and output as $(a)(x^m)$. Similarly, a multivariate, single term input polynomial having the form $ax^m y^n$ is factored and output as $(a)(x^m)(y^n)$.

Coefficient factorization module 218 is configured to factor out the greatest common factor (GCF) of the coefficients of an input polynomial. For example, given a polynomial, $5x^{106}+10x^{103}5x^{100}$, the constant 5 is factored out as the GCF of the coefficients (5, 10, and 5), leaving the remaining polynomial, $x^{106}+2x^{103}+x^{100}$.

Lowest power variable factorization module 220 is configured to factor out the lowest power of each variable found in each term of the polynomial. For example, given a polynomial, $x^6y^2+x^6yz+x^4y^3+x^4y^2z+2x^4y^2+2x^4yz$, $x^4$ is lowest power of the x variable found in each term and y is the lowest power of the y variable found in each term. As such, $x^4$ and y are factored out, leaving the remaining polynomial, $x^2y+x^2z+y^2+yz+2y+2z$.

Root factorization module 222 is configured to calculate the roots of a polynomial. For example, given a polynomial, $y^2+2y+1$, root factorization module 222 factors the polynomial to $(y+1)^2$.

Variable replacement module 224 is configured to simplify a polynomial by identifying the GCF, g, of the powers of a particular variable (e.g., x), and then replacing $x^g$ with a new variable (e.g., y). After the simplified polynomial is factored further (e.g., by another module of computer algebra application 206), variable replacement module 224 then reverses the variable replacement, replacing y with $x^g$.

Single variable factorization module 226 is configured to factor a multivariate polynomial according to a single variable, treating any other variables as constants. In an example implementation, for example, if the input polynomial is expressed in terms of variables x, y, and z, single variable factorization module 226 factors the polynomial based on variable x, treating variables y and z as constants. Single variable factorization module 226 then factors the result based on variable y, treating variables x and z as constants. Finally, single variable factorization module 226 factors the result based on variable z, treating variables x and y as constants.

Inverse polynomial calculation module 228 and linear transformation module 230 are configured to perform specialized pre-processing of specific types of input polynomials. Computer algebra, specifically computer-implemented symbolic polynomial factorization, may be challenged by specific types of polynomials. For example, consider the function:

$$f(x) = \frac{1}{1-x} = 1 + x + x^2 + x^3 + x^4 + \ldots$$

Computer algebra systems are typically not well-equipped to handle infinite series. Furthermore, many algorithms (e.g., the Hoeij algorithm), require a monic polynomial (i.e., a polynomial having a leading coefficient equal to 1).

Based on these limitations of computer algebra systems, specific types of pre-processing may be useful for polynomials that pose such challenges. For example, an efficient method for approximating an inverse of a polynomial will decrease processing time. As another example, converting a non-monic polynomial to a monic polynomial can simplify processing.

The Pade approximation is commonly used to calculate the inverse of a polynomial. However, the Pade approximation involves solving equations, which can be computationally expensive. As an alternative, consider a given polynomial:

$$p(x) = a_n x^n + a_{n-1} x^{n-1} + \ldots + a_1 x + a_0$$

where $a_n \neq 0$ and $a_0 \neq 0$, for which an approximation of the inverse is desired.

Setting $g(x) = -a_1 - a_2 x - \ldots - a_n x^{n-1}$ gives:

$$p(x) = a_0 - xg(x)$$

Applying the formula, $$\frac{1}{1-x} = 1 + x + x^2 + x^3 + x^4 + \ldots$$

gives:

$$\frac{1}{p(x)} = \frac{1}{a_0 - xg(x)} =$$

$$\frac{1}{a_0} \cdot \frac{1}{1 - \frac{xg(x)}{a_0}} = \frac{1}{a_0} \cdot \left(1 + \frac{xg(x)}{a_0} + \frac{(xg(x))^2}{a_0^2} + \ldots + \frac{(xg(x))^n}{a_0^n} + \ldots \right)$$

Using only the first n items as an approximation:

$$\frac{1}{p(x)} = \frac{1}{a_0 - xg(x)} =$$

$$\frac{1}{a_0} \cdot \frac{1}{1 - \frac{xg(x)}{a_0}} \approx \frac{1}{a_0} \cdot \left(1 + \frac{xg(x)}{a_0} + \frac{(xg(x))^2}{a_0^2} + \ldots + \frac{(xg(x))^n}{a_0^n} \right)$$

Simplifying further gives:

$$\frac{1}{p(x)} \approx \frac{a_0^n + a_0^{n-1}xg(x) + a_0^{n-2}(xg(x))^2 + \ldots + (xg(x))^n}{a_0^{n+1}}$$

In an example implementation, inverse polynomial calculation module 228 is implemented to calculate the above approximation of the inverse of an input polynomial, which is less costly in terms of computations as compared to the well-known Pade approximation.

In an example implementation, linear transformation module 230 is configured to convert a non-monic input polynomial to a monic polynomial. For example, many computer algebra algorithms do not function well on non-monic polynomials. Accordingly, if an input polynomial is non-monic, the polynomial is first converted to a monic polynomial before additional processing is performed. For example, given a polynomial:

$$p(x) = a_n x^n + a_{n-1} x^{n-1} + \ldots + a_1 x + a_0$$

where $a_n \neq 0$, applying a linear coordinate transformation, $y = a_n x$ gives:

$$p(x) = \frac{y^n + a_{n-1} y^{n-1} + a_n a_{n-2} y^{n-2} + \ldots + a_n^{n-2} a_1 y + a_n^{n-1} a_0}{a_n^{n-1}}$$

The result shown above has a monic polynomial as the numerator. In an example implementation, if computer algebra application receives a non-monic polynomial, and expects a monic polynomial, the linear coordinate transformation shown above is performed by linear transformation module 230. The numerator of the result is then processed as the monic polynomial. Subsequently, linear transformation module 230 reverses the transformation, using the inverse linear coordinate transformation, $$x = \frac{y}{a_n}.$$

Although illustrated in FIG. 2 as being stored in memory 204 of computing device 200, computer algebra application 206, or portions thereof, may be implemented using any form of computer-readable media that is accessible by computing device 200. Computer-readable media may include, for example, computer storage media and communications media.

Computer storage media includes volatile and non-volatile, removable and non-removable media implemented in any method or technology for storage of information such as computer readable instructions, data structures, program modules, or other data. Computer storage media includes, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium that can be used to store information for access by a computing device.

In contrast, communication media may embody computer readable instructions, data structures, program modules, or other data in a modulated data signal, such as a carrier wave, or other transport mechanism.

Example Operation

Figure 3:
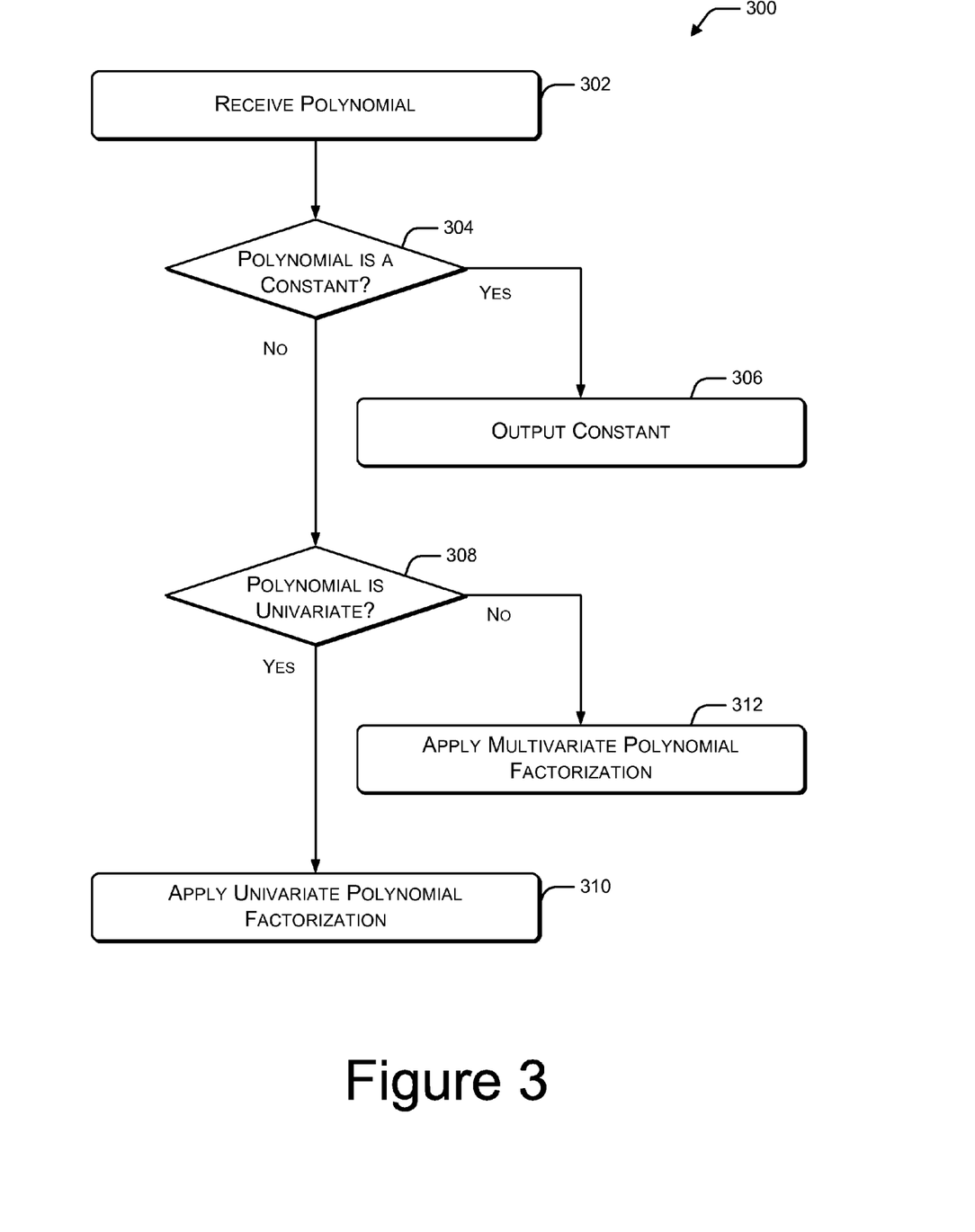
FIG. 3 is a flow diagram of an example process for classifying an input polynomial to be factored.
Figure 4A:
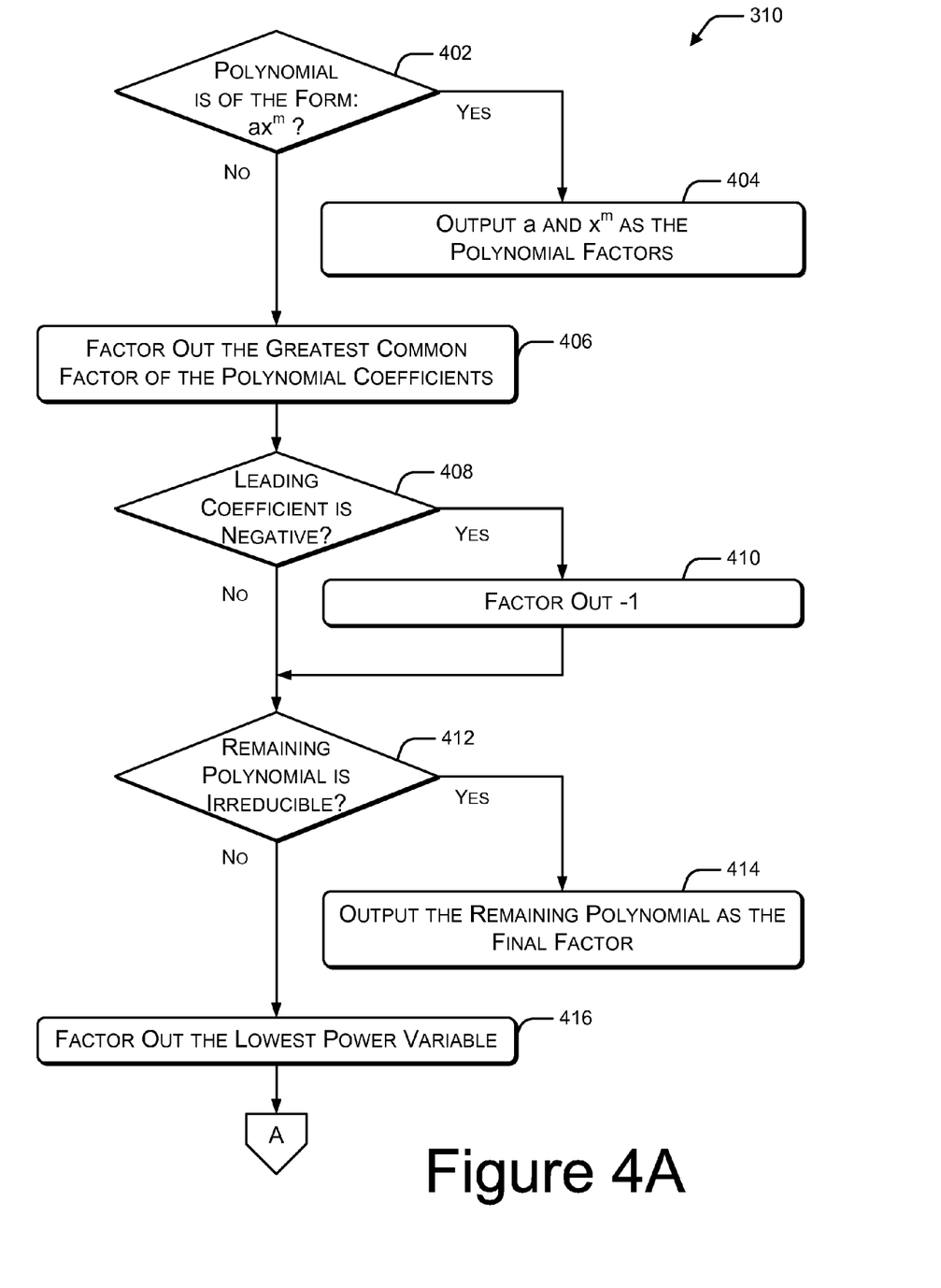
FIGS. 4A and 4B are a flow diagram of an example process for performing computer-implemented symbolic factoring of a univariate input polynomial.
Figure 4B:
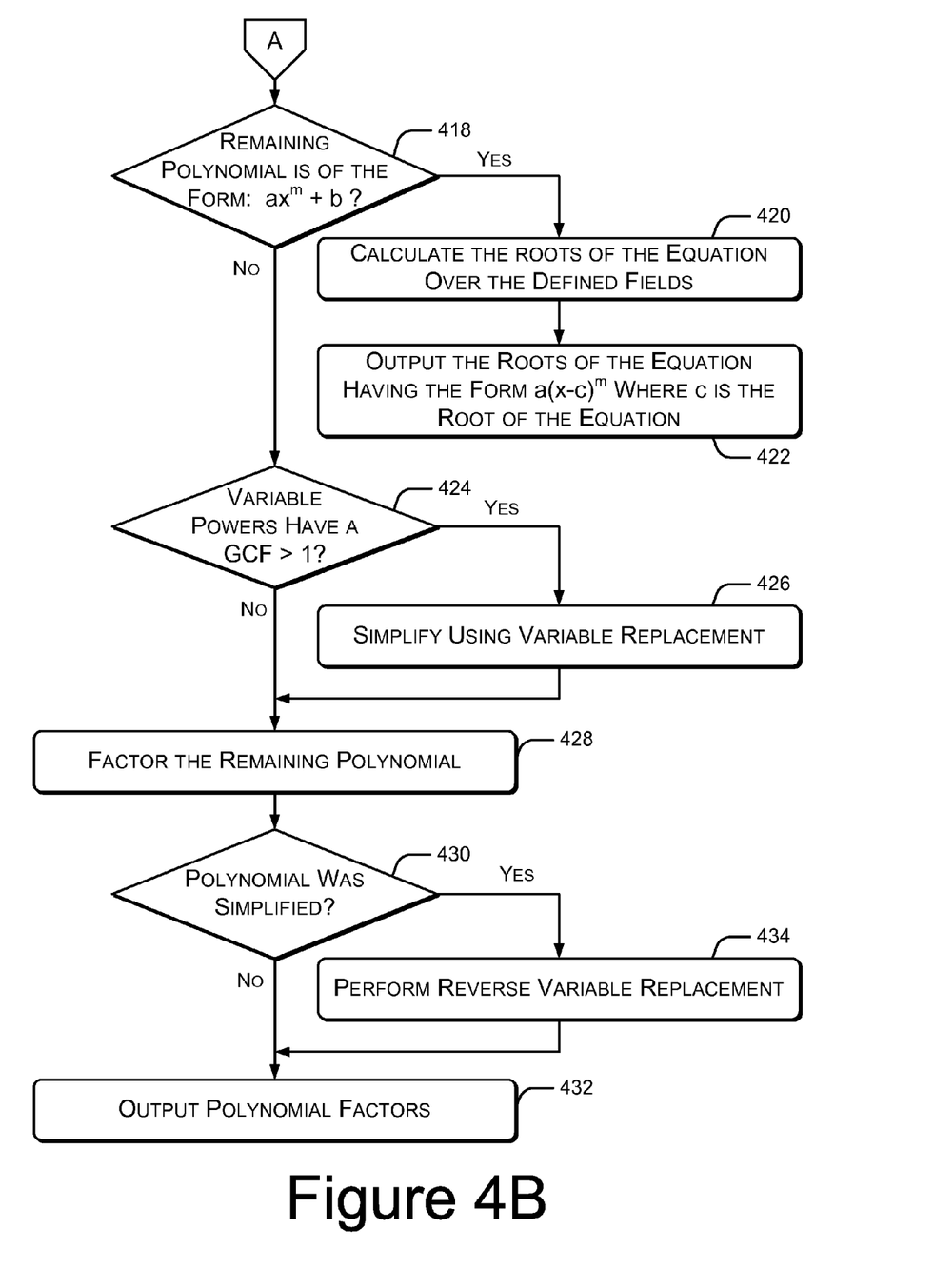
Figure 5A:
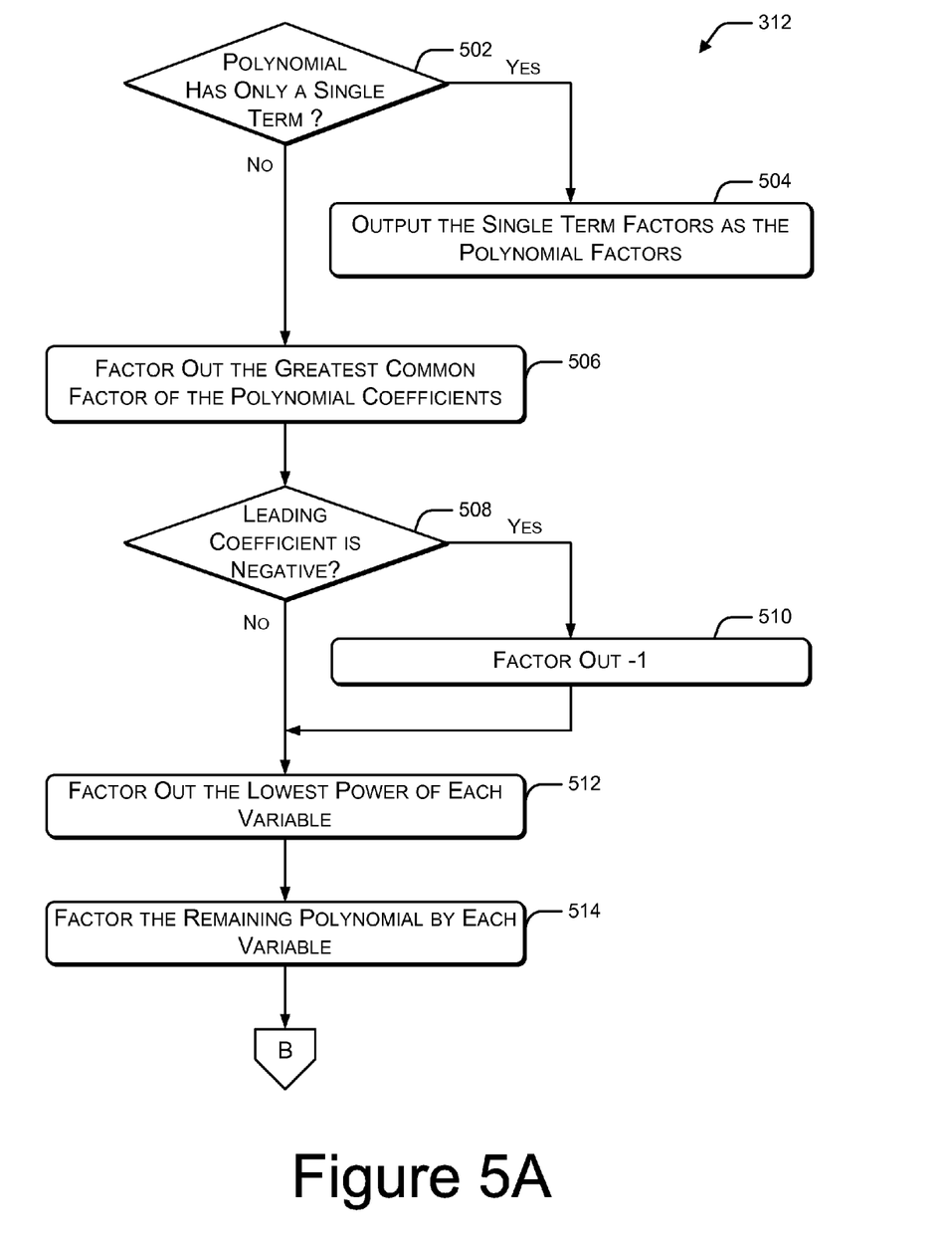
FIGS. 5A and 5B are a flow diagram of an example process for performing computer-implemented symbolic factoring of a multivariate input polynomial.
Figure 5B:
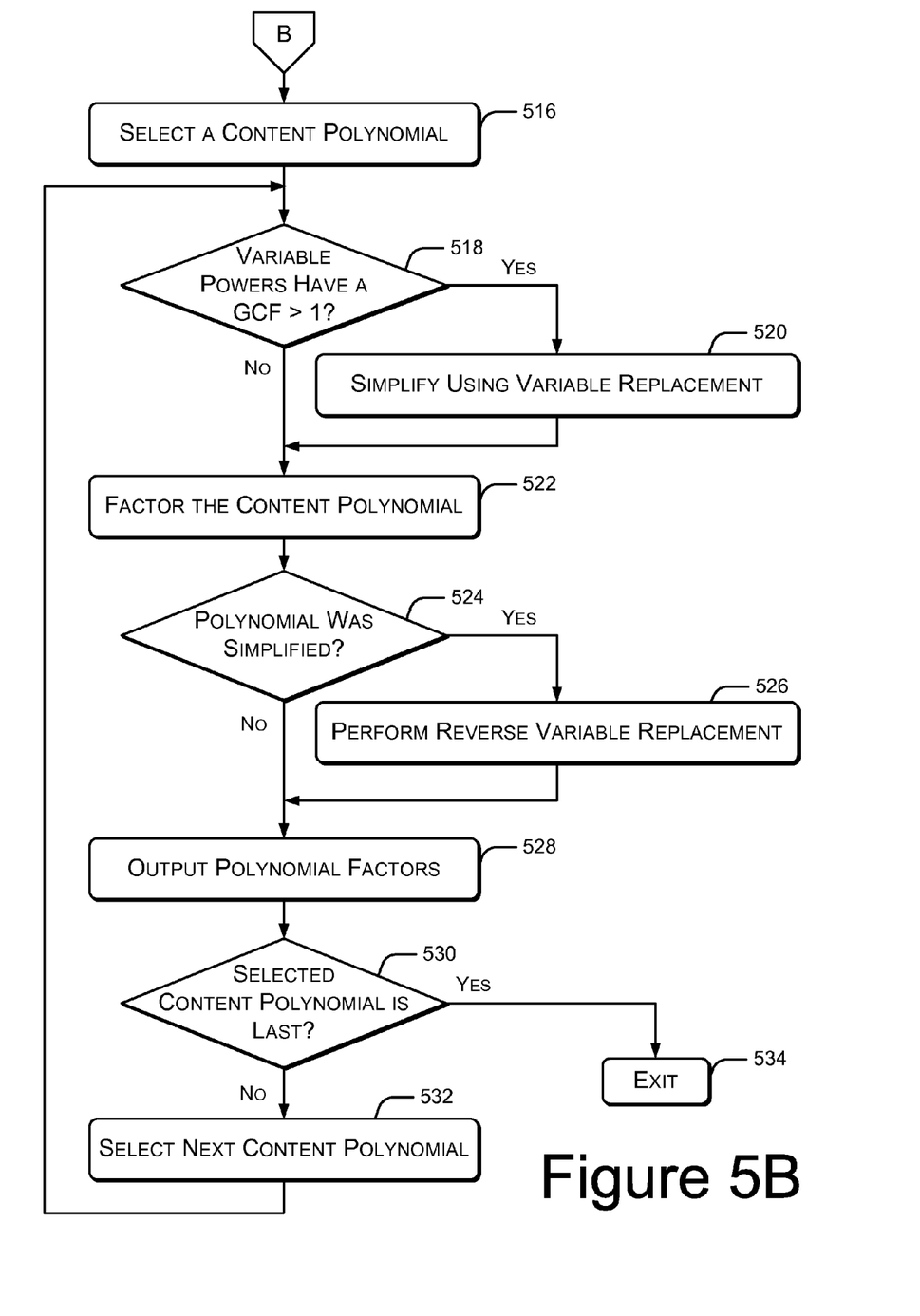

FIGS. 3-5 illustrate example processes 300 for factoring an input polynomial. Each process is illustrated as a collection of blocks in a logical flow graph, which represents a sequence of operations that can be implemented in hardware, software, or a combination thereof. In the context of software, the blocks represent computer-executable instructions stored on one or more computer-readable media that, when executed by one or more processors, direct the one or more processors to perform the recited operations. Note that the order in which each process is described is not intended to be construed as a limitation, and any number of the described process blocks can be combined in any order to implement the process, or an alternate process. Additionally, individual blocks may be deleted from the process without departing from the spirit and scope of the subject matter described herein. Furthermore, while these processes are described with reference to the computing device 200 of FIG. 2, other computer architectures may implement these processes in whole or in part.

FIG. 3 is a flow diagram of an example process 300 for factoring an input polynomial. At 302, an input polynomial is received. For example, computer algebra application 206 receives a user-submitted polynomial.

At 304, it is determined whether or not the input polynomial is a constant. For example, polynomial classification module 210 analyzes the input polynomial to determine whether the input polynomial is a constant (e.g., of the form, $f(x) = a$). If the input polynomial is determined to be a constant (the "Yes" branch from block 304), then at block 306, the constant is output as the only factor of the input polynomial.

If the input polynomial is not a constant (the "No" branch from block 304), then at 308, it is determined whether or not the input polynomial is a univariate polynomial. For example, polynomial classification module 210 evaluates the input polynomial to determine the number of variables found in the input polynomial. If the input polynomial includes only a single variable, then the input polynomial is determined to be a univariate polynomial. If the input polynomial includes multiple variables, then the input polynomial is determined to be a multivariate polynomial.

If the input polynomial is determined to be a univariate polynomial (the "Yes" branch from block 308), then at 310, univariate polynomial factorization is applied. An example process for performing univariate polynomial factorization is described below with reference to FIGS. 4A and 4B.

If the input polynomial is determined to be a multivariate polynomial (the "No" branch from block 308), then at 312, multivariate polynomial factorization is applied. An example process for performing multivariate polynomial factorization is described below with reference to FIGS. 5A and 5B.

FIGS. 4A and 4B illustrate an example process 310 for factoring a univariate polynomial. At 402, it is determined whether or not the input polynomial is of the form $ax^m$. For example, single term polynomial factorization module 216 receives the input polynomial, and analyzes the form of the input polynomial. If the input polynomial is of the form $ax^m$ (the "Yes" branch from block 402), then at 404, single term polynomial factorization module 216 outputs (a) and ($x^m$) as the factors of the input polynomial.

If it is determined that the input polynomial is not of the form $ax^m$ (the "No" branch from block 402), then at 406, the GCF of the input polynomial coefficients is factored out. For example, coefficient factorization module 218 extracts the coefficients of each term of the input polynomial and determines the GCF. The GCF of the coefficients is identified as a factor of the polynomial to be output, and the remaining polynomial is further processed as described below.

At 408, it is determined whether or not the leading coefficient is negative. If the leading coefficient of the remaining polynomial is negative (the "Yes" branch from block 408), then at 410, a −1 is identified as a factor of the polynomial to be output, and the remaining polynomial (with a positive leading coefficient) is further processed as described below. In an example implementation, coefficient factorization module 218 factors out the −1 as part of factoring out the GCF of the input polynomial coefficients, such that if the leading coefficient is negative, then the GCF that is identified is also negative (in this case, the GCF may be −1), leaving a remaining polynomial having a positive leading coefficient.

At 412, it is determined whether or not the remaining polynomial is irreducible. For example, the remaining polynomial is analyzed by polynomial factorization module 212 (e.g., using Einstein's criterion). If the remaining polynomial is irreducible (the "Yes" branch from block 412), then at 414, the remaining polynomial is output as the final factor of the input polynomial.

If it is determined that the remaining polynomial may be further reduced (the "No" branch from block 412), then at 416, the lowest power variable is factored out. For example, lowest power variable factorization module 220 identifies the term having the variable with the lowest power, and identifies that variable with the lowest power as a factor of the input polynomial. After factoring out the variable with the lowest power, the remaining polynomial is further processed as described below.

At 418 (shown in FIG. 4B), it is determined whether or not the remaining polynomial is of the form $ax^m+b$. For example, the remaining polynomial is provided as input to root factorization module 222 for analysis.

If it is determined that the remaining polynomial is of the form $ax^m+b$ (the "Yes" branch from block 418), then at 420, the roots of the remaining polynomial over the defined field are calculated. For example, root factorization module 222 calculates the roots of the remaining polynomial. At 422, the roots of the equation, having the form $a(x-c)^m$, where c is the root of the equation, are output as the final factors of the input polynomial.

If it is determined that the remaining polynomial is not of the form $ax^m+b$ (the "No" branch from block 418), then at 424, it is determined whether or not the powers of the variables in the remaining polynomial have a GCF that is greater than 1. For example, the remaining polynomial is provided as input to variable replacement module 224. Variable replacement module 224 examines the powers of the variables to determine whether or not the powers have a GCF that is greater than 1.

If it is determined that the powers of the variables in the remaining polynomial do not have a GCF that is greater than 1 (the "No" branch from block 424), then processing continues at 428, described below.

If the powers of the variables in the remaining polynomial have a GCF that is greater than 1 (the "Yes" branch from block 424), then at 426, the remaining polynomial is simplified using variable replacement. For example, if the input polynomial is expressed in terms of variable, x, variable replacement module 224 identifies g as the GCF of the powers of x in the remaining polynomial, and replaces $x^g$ with y.

At 428, the remaining polynomial is factored according to a factorization method. For example, polynomial factorization module 212 applies the Berlekamp-Zassenhaus algorithm to factor the remaining polynomial.

At 430, a determination is made as to whether or not the polynomial was simplified using variable replacement, as described above with reference to block 426. For example, variable replacement module 224 analyzes the results of polynomial factorization module 212 to determine whether the factors include only the single variable of the input polynomial or whether the factors include a replacement variable. If the factors include only the original single variable (the "No" branch from block 430), then at 432, the factors output from polynomial factorization module 212 are output as the final factors of the input polynomial.

If the factors output from polynomial factorization module 212 include the replacement variable (the "Yes" branch from block 430), then at 434, reverse variable replacement is performed. For example, as described above with reference to block 426, during the simplification, $x^g$ was replaced with y. To reverse the simplification, variable replacement module 224 replaces each y in the factors output from polynomial factorization module 212 with $x^g$. At 432, the factors are then output as the final factors of the input polynomial.

To illustrate the univariate polynomial factorization described above with reference to FIGS. 4A and 4B, consider the input polynomial:

$$5x^{106}+10x^{103}+5x^{100}$$

The input polynomial is not of the form $ax^m$, so processing continues at block 406.

According to block 406, the GCF of the polynomial coefficients is factored out. The coefficients are 5, 10, and 5. Accordingly, the GCF of the coefficients is 5, so 5 is identified as a factor, and the remaining polynomial is:

$$x^{106}+2x^{103}+x^{100}$$

The leading coefficient (1) is non-negative, so processing continues at block 412. The remaining polynomial is further reducible, so processing further continues at block 416.

According to block 416, the lowest power variable of the remaining polynomial is factored out. The powers of the variables are 106, 103, and 100. Accordingly, the lowest power variable is $x^{100}$, so $x^{100}$ is identified as a factor, and the remaining polynomial is:

$$x^6+2x^3+1$$

The remaining polynomial is not of the form $ax^m+b$, so processing continues at block 424.

According to block 424, it is determined whether or not the variable powers of the remaining polynomial have a GCF. The variable powers are 6 and 3, which have a GCF of 3. Accordingly, based on block 426, the remaining polynomial is simplified using variable replacement. As described above, $x^3$ is replaced in the remaining polynomial with y. The remaining polynomial is then:

$$y^2+2y+1$$

According to block 428, the remaining polynomial is then factored down to $(y+1)^2$. According to block 432, because the remaining polynomial was previously simplified using variable replacement, the y is now replaced with $x^3$, resulting in the final factor:

$$(x^3+1)^2$$

According to block 434, the identified factors are then output. In this example, as described above, the input polynomial and its factors are:

$$5x^{106}+10x^{103}+5x^{100}=(5)(x^{100})(x^3+1)^2$$

FIGS. 5A and 5B are a flow diagram of an example process 312 for factoring a multivariate polynomial. At 502, it is determined whether or not the input polynomial has only a single term. For example, a two-variable polynomial has a single term if it is of the form, $ax^m y^n$. At 502, single term polynomial factorization module 216 receives the input polynomial, and analyzes the form of the input polynomial. If the input polynomial is of the form $ax^m y^n$, or a similar form for a polynomial having additional variables, (the "Yes" branch from block 502), then at 504, single term polynomial factorization module 216 outputs (a), ($x^m$), and ($y^n$) as the final factors of the input polynomial.

If it is determined that the remaining polynomial is not a single-term polynomial (the "No" branch from block 502), then at 506, the greatest common factor (GCF) of the input polynomial coefficients is factored out. For example, coefficient factorization module 218 extracts the coefficients of each term of the input polynomial and determines the GCF. The GCF of the coefficients is identified as a factor of the polynomial to be output, and the remaining polynomial is further processed as described below.

At 508, it is determined whether or not the leading coefficient is negative. If the leading coefficient of the remaining polynomial is negative (the "Yes" branch from block 508), then at 510, a −1 is identified as a factor of the polynomial to be output, and the remaining polynomial (with a positive leading coefficient) is further processed as described below. In an example implementation, coefficient factorization module 218 factors out the −1 as part of factoring out the GCF of the input polynomial coefficients, such that if the leading coefficient is negative, then the GCF that is identified is also negative (the GCF may be −1), leaving a remaining polynomial having a positive leading coefficient.

At 512, the lowest power of each variable is factored out. For example, lowest power variable factorization module 220 identifies, for each variable, the term having the variable with the lowest power, and identifies that variable with the lowest power as a factor of the input polynomial. After factoring out the variables with the lowest power, the remaining polynomial is further processed as described below.

At 514, the remaining polynomial is factored by each variable, such that a content polynomial results from each factorization. For example, if the variables of the polynomial are $x_i$, i=0, 1, 2, . . . , n, then single variable factorization module 226 selects $x_0$, and factors the polynomial with respect to $x_0$, treating the remaining variables as constants, resulting in a first content polynomial. Single variable factorization module 226 repeats this process for the remaining polynomial for each variable.

At 516 (shown in FIG. 5B), a content polynomial (resulting from the factoring described above with reference to block 514) is selected.

At 518, it is determined whether or not the powers of a variable in the content polynomial have a GCF that is greater than 1. For example, variable replacement module 224 examines the powers of the variable to determine whether or not the powers of the variable have a GCF greater than 1.

If it is determined that the powers of the variable in the content polynomial do not have a GCF that is greater than 1 (the "No" branch from block 518), then processing continues at 522, described below.

If the powers of the variable in the content polynomial have a GCF that is greater than 1 (the "Yes" branch from block 518), then at 520, the content polynomial is simplified using variable replacement. For example, if variable x is the variable in the content polynomial, variable replacement module 224 identifies g as the GCF of the powers of x in the content polynomial, and replaces $x^g$ with y.

At 522, the content polynomial is factored according to a factorization method. For example, polynomial factorization module 212 applies the Berlekamp-Zassenhaus algorithm to factor the content polynomial.

At 524, a determination is made as to whether or not variable replacement was performed, as described above with reference to block 520. For example, variable replacement module 224 analyzes the results of polynomial factorization module 212 to determine whether the factors include the original variable of the content polynomial or whether the factors include a replacement variable (described above with reference to block 520). If the factors include only the original variable (the "No" branch from block 524), then processing continues as described below with reference to block 528.

If the factors output from polynomial factorization module 212 include the replacement variable (the "Yes" branch from block 524), then at 526, reverse variable replacement is performed. For example, as described above with reference to block 520, during the simplification, $x^g$ was replaced with y. To reverse the simplification, variable replacement module 224 replaces each y in the factors output from polynomial factorization module 212 with $x^g$.

At 528, the factors of the content polynomial are output.

At 530, it is determined whether or not the previously selected content polynomial is the last content polynomial (as determined according to block 514). If the previously selected content polynomial is not the last content polynomial (the "No" branch from block 530), then at 532, the next content polynomial is selected, and processing continues as described above with reference to block 518.

When it is determined, at block 530, that the previously selected content polynomial is the last content polynomial (the "Yes" branch from block 530), at 534 the factorization is complete.

To illustrate the multivariate polynomial factorization described above with reference to FIGS. 5A and 5B, consider the input polynomial:

$$3x^6y^2+3x^6yz+3x^4y^3+3x^4y^2z+6x^4y^2+6x^4yz+3x^2y^3+3x^2y^2z+3x^2y^2+3x^2yz$$

The polynomial is not a single-term polynomial, so processing proceeds to block 506.

According to block 506, the GCF of the polynomial coefficients is factored out. The coefficients are 3, 3, 3, 3, 6, 6, 3, 3, 3, and 3. Accordingly, the GCF of the coefficients is 3, so 3 is identified as a factor, and the remaining polynomial is:

$$x^6y^2+x^6yz+x^4y^3+x^4y^2z+2x^4y^2+2x^4yz+x^2y^3+x^2y^2z+x^2y^2+x^2yz$$

The leading coefficient (1) is non-negative, so processing continues at block 512.

According to block 512, the lowest power of each variable of the remaining polynomial is factored out. The powers of the variable x are 6, 6, 4, 4, 4, 4, 2, 2, 2, and 2. Accordingly, the lowest power x variable is $x^2$. So, $x^2$ is identified as a factor. Similarly, the powers of the variable y are 2, 1, 3, 2, 2, 1, 3, 2, 2, and 1. Accordingly, the lowest power y variable is y. So, y is identified as a factor. The powers of the variable z are 0, 1, 0, 1, 0, 1, 0, 1, 0, and 1. Accordingly, the lowest power z variable is $z^0$, which is 1, so no power of the z variable is identified as a factor. After factoring out $x^2$ and y, the remaining polynomial is:

$$x^4y+x^4z+x^2y^2+x^2yz+2x^2y+2x^2z+y^2+yz+y+z$$

According to block 514, the remaining polynomial is then factored by each variable, treating the remaining variables as constants, resulting in content polynomials. Factoring first according to variable x, the first content polynomial is:

$$x^4(y+z)+x^2(y^2+yz+2y+2z)+y^2+yz+y+z$$

Next, factoring the remaining polynomial according to variable y, the second content polynomial is:

$$y^2(x^2+1)+y(x^4+x^2z+2x^2+z+1)+x^4z+2x^2z+z$$

Finally, factoring the remaining polynomial according to variable z, the third content polynomial is:

$$z(x^4+x^2y+2x^2+y+1)+x^4y+x^2y^2+2x^2y+y^2+y$$

According to block 516, the first content polynomial is selected.

According to block 518, it is determined whether or not the powers of a variable in the content polynomial have a GCF greater than one. The powers of variable x are 4, 2, and 2, which have a GCF of 2. Accordingly, based on block 520, the first content polynomial is simplified using variable replacement. As described above, $x^2$ is replaced in the first content polynomial with a replacement variable, p. The first content polynomial is then:

$$p^2(y+z)+p(y^2+yz+2y+2z)+y^2+yz+y+z$$

According to block 522, the content polynomial is then factored down to:

$$p^2(y+z)+p(y+2)(y+z)+(y+1)(y+z)$$

which is further simplified to $(y+z)(p+1)(p+y+1)$.

According to block 526, because the remaining polynomial was previously simplified using variable replacement, the p is now replaced with $x^2$, resulting in:

$$(y+z)(x^2+1)(x^2+y+1)$$

According to block 528, factors $(y+z)$, $(x^2+1)$, and $(x^2+y+1)$ are then output as the factors of the content polynomial.

According to block 530, it is determined whether or not the selected content polynomial is the last content polynomial. In this case, two content polynomials remain, so according to block 532, the second content polynomial is selected, and the described factoring is repeated.

The factorization is determined to be complete after each of the three content polynomials is factored according to this process.

For the example input polynomial given above, the polynomial is determined to have the following factors:

$$(3)(x^2)(y)(y+z)(x^2+1)(x^2+y+1)$$

Berlekamp-Zassenhaus (d-1) Test

The Berlekamp-Zassenhaus (B-Z) algorithm is a well-known standard algorithm for factoring polynomials having rational coefficients, and, as described above, in an example implementation, polynomial factorization module 212 may be configured to execute the B-Z algorithm. For example, in the processes described above with reference to FIGS. 4A, 4B, 5A, and 5B, blocks 428 and 522 represent polynomial factorization, which may be implemented using the B-Z algorithm. The computational complexity of the B-Z algorithm depends, exponentially, on the number of modular factors of a given polynomial, f, because of the algorithm's process of choosing subsets of identified potential factors.

For example, let $f \in Z[X]$ be a monic, square-free polynomial of degree n, represented as $f=\Sigma_{i=0}^n a_i x^i$ with $a_i \in Z$, and defining a natural D to be an upper bound for the number of digits of the coefficients $a_i$. For theoretical consideration, using factorization over the ring of p-adic integers, denoted by $Z_p$, polynomial f is factored in $Z_p[X]$, yielding a factorization $f=\Pi_{i=1}^r f_i$, where $f_i \in Z_p[X]$ are the monic irreducible factors of f in $Z_p[X]$.

Further, denoting the field of p-adic rational numbers by $Q_p$, based on the B-Z algorithm, it must now be determined which of the factors $f_i$ can be combined to form a factor of f in Z[X]. There are $2^r$ possibilities, which can be encoded in a vector v of length r, i.e., $v=(v_1, \ldots, v_r) \in \{0, 1\}^r$. $v_i=1$ denotes that the factor $f_i$ is included in the product to build a factor in Z[X]. More precisely, $g_v=\Pi f_i^{v_i}$. Accordingly, $\{g_v | v \in \{0, 1\}^r\}$ is the set of all monic factors of f in $Z_p[X]$. However, the factors of most interest are those in Z[X]. Setting $V=\{v \in \{0, 1\}^r | g_v \in Z[X]\}$, $\{g_v | v \in V\}$ is the set of all monic factors of f in Z[X].

Finally, restricting the set V to all irreducible factors of f yields:

$$B=\{v \in V | g_v \text{ irreducible in } Z[X]\}$$

Thus, B contains the desired combinations of factors. Since Z[X] has unique factorization, the set V consists of all $\{0, 1\}$-linear combinations of B.

The B-Z algorithm first computes a modular factorization modulo a power of p using Hensel lifting. The next step is to compute the set B that corresponds to the "good" combinations of modular factors. The computation time for computing this factorization is bounded by a polynomial $P_Z(n, D)$. Essentially, the B-Z algorithm tries out every factor combination, starting with single factors, then moving on to products of two factors, products of three factors, and so on. For every combination, the algorithm test whether the computed product $g_v$ for all $v \in B$ yields the desired set of irreducible factors f of over Z[X].

If r is small (e.g., r<15), $2^{r-1}$ is so small that using the B-Z algorithm is likely the best choice. When using the B-Z algorithm, however, the algorithm's performance is increased with the addition of the (d-1) test. Specifically, if $g=x^d+b_{d-1}x^{d-1}+b_{d-2}x^{d-2}+ \ldots +b_0$ is a known factor of f of degree d, then it is also true that $|b_{d-1}| \leq \text{Rootbound}(f)d$.

Based on this information, the performance of polynomial factorization module 212, configured to implement the B-Z algorithm, is increased. Once a known factor, g, is identified, knowing that $|b_{d-1}| \leq \text{Rootbound}(f)d$ reduces the number of modular factor combinations that must be evaluated.

Conclusion

Although the subject matter has been described in language specific to structural features and/or methodological acts, it is to be understood that the subject matter defined in the appended claims is not necessarily limited to the specific features or acts described. Rather, the specific features and acts are disclosed as exemplary forms of implementing the claims.

What is claimed is:

1. A method comprising:
   on a computing device executing a computer algebra application, the computer algebra application performing operations including:
      identifying an original polynomial to be symbolically factored;
      pre-processing the original polynomial at a polynomial pre-processing module to identify one or more pre-processing factors and a remaining polynomial, the pre-processing including:
         factoring out a greatest common factor of coefficients of the original polynomial at a coefficient factorization module; and
         factoring out a variable having a lowest power found in each term of the original polynomial at a lowest power variable factorization module;
      factoring the remaining polynomial to identify factors of the remaining polynomial; and
      returning the pre-processing factors and the factors of the remaining polynomial as factors of the original polynomial.

2. A method as recited in claim 1, wherein the pre-processing further includes:

identifying a variable, x, of the original polynomial;
determining a greatest common factor, g, of powers of the variable, x; and
replacing $x^g$ with a replacement variable, y.

3. A method as recited in claim 1, wherein the original polynomial is a multivariate polynomial, and the pre-processing further includes:
identifying a first variable of the original polynomial; and
factoring the original polynomial based on the first variable while treating a second variable of the original polynomial as a constant.

4. A method as recited in claim 3, wherein the pre-processing further includes:
identifying a second variable of the original polynomial; and
factoring the original polynomial based on the second variable while treating the first variable of the original polynomial as a constant.

5. A method as recited in claim 1, wherein:
the remaining polynomial is f(x); and
factoring the remaining polynomial comprises:
applying a Berlekamp-Zassenhaus algorithm to the remaining polynomial to identify a factor, monic polynomial g of the remaining polynomial, where subsequent coefficients of g are constants; and
based on a (d-1) test, identifying additional factors of the remaining polynomial.

6. A method as recited in claim 1, further comprising classifying the original polynomial based on a number of variables in the original polynomial.

7. A method as recited in claim 6, wherein pre-processing the original polynomial includes performing a subset of available pre-processing operations based on a classification of the original polynomial.

8. A method as recited in claim 1, further comprising:
classifying the original polynomial as one of:
a constant;
a univariate polynomial having a single variable; or
a multivariate polynomial having multiple variables; and
pre-processing the original polynomial based on a result of the classifying.

9. A system comprising:
a processor; and
a computer algebra application executed on the processor, the computer algebra application including:
polynomial classification instructions to classify an original polynomial as a univariate polynomial or a multivariate polynomial;
polynomial pre-processing instructions to simplify the original polynomial based at least on a classification of the original polynomial, resulting in a pre-processed polynomial; and
polynomial factorization instructions to factor the pre-processed polynomial.

10. A system as recited in claim 9, wherein the computer algebra application further includes inverse polynomial calculation instructions to approximate an inverse of a polynomial, $$p(x) = a_n x^n + a_{n-1} x^{n-1} + \ldots + a_1 x + a_0$$

as:

$$\frac{1}{p(x)} \approx \frac{a_0^n + a_0^{n-1} x g(x) + a_0^{n-2} (x g(x))^2 + \ldots + (x g(x))^n}{a_0^{n+1}}$$

where $g(x) = -a_1 - a_2 x - \ldots - a_n x^{n-1}$.

11. A system as recited in claim 9, wherein the computer algebra application further includes linear transformation instructions to convert a non-monic polynomial to a ratio having a monic polynomial as a numerator.

12. A system as recited in claim 11, wherein the linear transformation instructions convert a non-monic polynomial, $$p(x) = a_n x^n + a_{n-1} x^{n-1} + \ldots + a_1 x + a_0$$

where $a_n \neq 0$, to a ratio having a monic polynomial as a numerator by applying a linear coordinate transformation, $y = a_n x$, such that:

$$p(x) = \frac{y^n + a_{n-1} y^{n-1} + a_n a_{n-2} y^{n-2} + \ldots + a_n^{n-2} a_1 y + a_n^{n-1} a_0}{a_n^{n-1}}.$$

13. One or more computer storage media storing computer-executable instructions that, when executed, cause one or more processors to perform operations comprising:
identifying an original polynomial in symbolic form, the original polynomial including:
coefficients;
variables; and
powers of the variables;
pre-processing the original polynomial to generate pre-processed factors and a pre-processed polynomial, the pre-processing including:
determining a greatest common factor of the coefficients of the original polynomial;
in an event that the greatest common factor of the coefficients is greater than one, factoring out the greatest common factor of the coefficients as a factor of the original polynomial;
determining a leading coefficient of the original polynomial, the leading coefficient being associated with a variable having a highest power in the original polynomial;
in an event that the leading coefficient is negative, factoring out a negative one as a factor of the original polynomial;
for each variable in the original polynomial, factoring out a lowest power of the variable that is found in each term of the original polynomial;
for each variable in the original polynomial:
calculating a greatest common factor of the powers of the variable; and
replacing the variable to the power of the greatest common factor of the powers of the variable with a replacement variable not found in the original polynomial;
factoring the pre-processed polynomial to generate additional factors;
for each replacement variable in the additional factors, replacing the replacement variable with the variable to the power of the greatest common factor, which was previously replaced with the replacement variable; and
returning the pre-processed factors and the additional factors as a factored representation of the original polynomial.

14. One or more computer storage media as recited in claim 13, wherein factoring the pre-processed polynomial to generate additional factors includes applying a Berlekamp-Zassenhaus algorithm to the pre-processed polynomial.

15. One or more computer storage media as recited in claim 14, wherein applying the Berlekamp-Zassenhaus algorithm to the pre-processed polynomial includes using a (d-1) test to reduce a number of modular factor combinations to be evaluated.

16. One or more computer storage media as recited in claim 13, the pre-processing further including approximating an inverse of the original polynomial, wherein:

the original polynomial is represented by: $p(x) = a_n x^n + a_{n-1} x^{n-1} + \ldots + a_1 x + a_0$;
$g(x) = -a_1 - a_2 x - \ldots - a_n x^{n-1}$; and
the inverse of the original polynomial is represented by $$\frac{1}{p(x)} \approx \frac{a_0^n + a_0^{n-1} x g(x) + a_0^{n-2}(xg(x))^2 + \ldots + (xg(x))^n}{a_0^{n+1}}.$$

17. One or more computer storage media as recited in claim 13, wherein the original polynomial is a non-monic polynomial, the pre-processing further including applying a linear transformation to convert the original polynomial to a ratio having a monic polynomial numerator.

* * * * *